Sept. 13, 1927.

F. LÜSCHEN ET AL

ALTERNATING CURRENT TELEGRAPHY

Filed Sept. 6, 1923

Inventors
Fritz Lüschen, and
Karl Küpfmüller
by Knight Bro
attorneys

Patented Sept. 13, 1927.

1,642,453

UNITED STATES PATENT OFFICE.

FRITZ LÜSCHEN, OF BERLIN-SUDENDE, AND KARL KÜPFMÜLLER, OF BERLIN-FRIEDENAU, GERMANY, ASSIGNORS TO SIEMENS & HALSKE, AKTIENGESELLSCHAFT, OF SIEMENSSTADT, NEAR BERLIN, GERMANY, A CORPORATION OF GERMANY.

ALTERNATING-CURRENT TELEGRAPHY.

Application filed September 6, 1923, Serial No. 661,174, and in Germany March 16, 1923.

This invention relates to a method of alternating current telegraphy over long homogeneous cables, in particular submarine cables having increased inductance.

It is well known that recently efforts have been made in line telegraphy to transmit signals by alternating current, on account of the advantages connected therewith.

If an alternating current of limited duration (a signal) is impressed upon one end of the cable a current will be produced at the other (receiving) end of the cable which may be regarded as constituting a current, which first increases comparatively slowly and thereupon decreases at the same rate.

The alternating current element may be called a "steady state current" whereas the slow passing part may be termed a "transient" or a "direct current impulse." As will be set forth in this specification it is very favorable for alternating current telegraphy that the alternating current element does not commence with very small amplitudes and thereupon only gradually become stronger. Neither should the alternating current element decrease its amplitude gradually but it should drop suddenly. The alternating current element of the receiver current will therefore last as long as the current which is impressed upon the cable at the sending end of the same, so that no distortion of the signals will take place. Disturbances might however easily occur on account of the direct current impulse, the so called "transient impulse".

From the accurate theory and practical tests it follows, that a slowly travelling direct current impulse is superimposed over the arriving alternating current signal, as will be explained hereinafter with reference to Fig. 1 of the drawing. If this direct current impulse has a great amplitude in comparison with the alternating current, it may easily happen that the receiving apparatus is mainly operated by the direct current impulse.

The object of the present invention is to render the alternating current predominant over the direct current impulse in the receiving apparatus. This object is attained on the one hand by a suitable choice of the alternating current frequency in view of the cable constants and on the other hand by providing suitable connecting means which attenuate or suppress the direct current impulses, but not the carrier current.

The invention will be better understood from the following theoretical considerations in connection with the accompanying diagrammatical drawings, in which Fig. 1 represents a graph showing the voltage form of a signal impressed at the transmitting end and the current form of the signal arriving at the receiving end of a cable.

Figure 1:
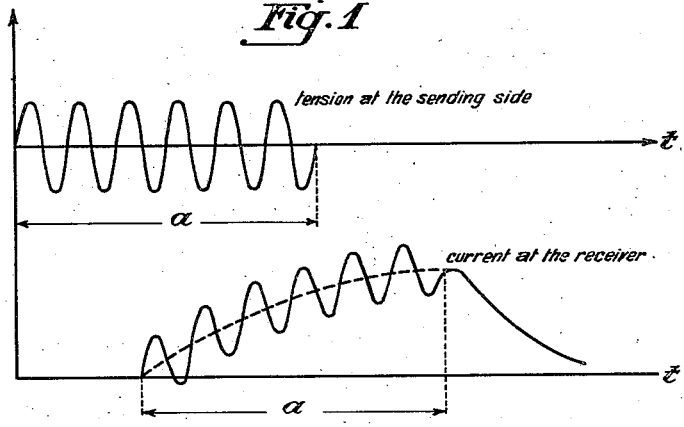

The strength represented by the direct current impulses follows from the following considerations:

Carson has shown (Proceedings Am. Inst. E. E., 1919, Vol. II, page 407), that when an electromotive direct current voltage E is suddenly applied to an electrical system, the current I flowing in any part of the system may be expressed in the form $$I = E\Phi(t)$$

where $\Phi(t)$ is a function of the time which Carson has called the indicial admittance. If the impressed voltage is of another form which may be expressed by $E = f(t)$ Carson has shown that the current may be obtained by the equation:

$$I = \frac{d}{dt}\int_0^t f(t-\lambda)\Phi(\lambda)d\lambda \quad (1)$$

which equation corresponds to the equation (11) in the paper of Carson referred to above.

From this follows for the received current I, when suddenly applying a voltage of the form $E = f(t) = A\sin\omega t$ at the sending end, the equation:

$$I = AU(t) + I_e$$

Here $I_e$ indicates the purely periodical alternating current component and $AU(t)$ indicates the transient.

This equation as well as the following equations (2) and (3) are explained and derived in the work of Lüschen and Küpfmüller: "The development of continuous sine oscillations in a long homogeneous cable", published in the "Wissenschaftliche Veröffentlichungen aus dem Siemens-Konzern", Vol. III, November 1st, 1923.

$U(t)$ is a function of the time, which after the equation (1) may be represented by:

$$U(t) = \frac{1}{\omega}\frac{d\Phi}{dt} - \frac{1}{\omega^3}\frac{d^3\Phi}{dt^3} + \frac{1}{\omega^5}\frac{d^5\Phi}{dt^5} + \cdots \quad (2)$$

The alternating current component $I_e$ of the current entering a receiver apparatus of the same wave resistance as the line may be calculated by the known symbolic method. In this manner results for the amplitude $I_e$ the expression $$I_e = A e^{-\beta l} \cdot \frac{1}{Z} \quad (3)$$

if a cable of the length $l$ and with the attenuation constant $\beta$, and the characteristic impedance $Z$ is considered. From equation (2) it follows that the transient current decreases in its amplitude with the increase of the frequency and at a sufficiently high frequency becomes $$U(t) = \frac{1}{\omega}\frac{d\Phi}{dt} \quad (4)$$

By increasing the frequency a means is therefore given, to keep the current as small as desired compared with the signalling current $I_e$. The current tends with an increase of the frequency to attain the value $$I_e = A\sqrt{\frac{C}{L}} e^{-\beta l} \quad (5)$$

wherein $$\beta = \frac{R}{2}\sqrt{\frac{C}{L}} + \frac{G}{2}\sqrt{\frac{C}{L}}$$

In these equations C denotes the capacity, L the inductance, G the leakage and R the resistance per unit length of the cable.

It appears therefore favorable to choose as high a frequency as possible for the carrier oscillations, as also will follow f.inst. from the essay by K. H. Wagner "Die Aussichten der Telephonie und Telegraphie", published in the "Elektrotechnische Zeitschrift" 1910, page 163. In practical use a difficulty arises, however, from the fact, that the leakage G increases with the frequency and in this manner the signalling current $I_e$ is also attenuated with the increase of the frequency.

Thus by increasing the frequency on the one hand the advantage is obtained, that the disturbing transient current is diminished, but on the other hand the drawback arises that the signalling currents are also considerably attenuated. At a sufficiently high frequency the signalling currents even become infinitely small compared with the transient current.

By means of the invention it now becomes possible to predetermine the most favorable carrier frequency which can be obtained in view of these two opposing facts. This most favorable case occurs, when the ratio between the transient current and the alternating carrier current becomes a minimum.

On examining the formulæ (4) and (5) it will be seen that this exponent has the value $$\frac{1}{\omega} \cdot \frac{d\Phi}{dt} \cdot \sqrt{\frac{Z}{C}} \cdot e^{\frac{Rl}{Z}\sqrt{\frac{C}{Z}} + \frac{Gl}{Z}\sqrt{\frac{L}{C}}}$$

Since $\sqrt{\frac{L}{C}}$ as well as $\frac{d\Phi}{dt}$ and $\frac{Rl}{2}\sqrt{\frac{C}{L}}$ are independent from the angular velocity $\omega$, the expression $$\eta = \frac{1}{\omega} \cdot e^{\frac{Al}{2}\sqrt{\frac{L}{C}}}$$

must therefore become a minimum. It is, however, known, that the leakage G increases within a wide range proportional to the frequency and that therefore $G = \delta C\omega$ wherein $\delta$ indicates the dielectric power factor.

Thus $$\eta = \frac{1}{\omega} \cdot e^{\omega \cdot \frac{1}{2} \delta \sqrt{L \cdot C} \cdot l}$$

Figure 2:
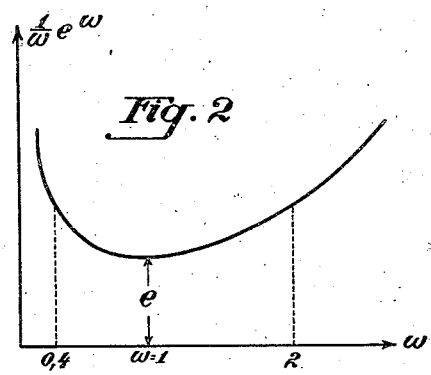
Fig. 2 is a curve diagram by means of which the most favorable carrier frequencies for the telegraphing may be determined.

This value is represented in Fig. 2 in dependence of the angular velocity $\omega$ under the assumption that $\frac{1}{2}\delta \cdot l\sqrt{L.C.}$ for example is $= 1$.

It will be seen, that this function at $\omega = 1$ has a minimum value. If $\frac{1}{2}\delta \cdot l\sqrt{L.C.}$ is not equal to 1, the minimum is situated at:

$$\omega \frac{1}{2}\delta l \sqrt{\frac{L}{C}} = 1$$

From this follows:

$$\omega_0 = \frac{2}{\delta l \sqrt{L \cdot C}}$$

This is therefore the frequency, which is most favorable for the purposes of telegraphy.

From Fig. 2 it will be seen, that the function varies only slightly from its minimum value in the range between $$\omega_1 = \frac{0.8}{\delta \cdot l \sqrt{L \cdot C}} \text{ and } \omega_2 = \frac{4}{\delta \cdot l \sqrt{L \cdot C}}$$

The entire frequency value is therefore available for alternating current telegraphy. The cable is therefore not confined to the use of one frequency only, but may be utilized equally well for multiple telegraphy.

Figure 3:
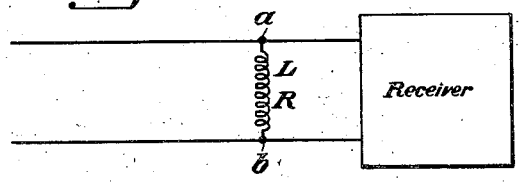
Fig. 3 is a receiving coupling through which the transient impulse has been suppressed as much as possible, whereas the alternating current component is transmitted without attenuation.

It is, however, also possible to attain a weakening of the transient direct current impulse compared with the alternating carrier current by means of appropriate connections. The further improvement is based on the fact that the superimposed direct current impulse passes slowly compared with the quickly pulsating alternating current. As will be seen, for instance from the aforementioned paper of Lüschen and Küpfmüller one object of the invention is also to attenuate effectively or suppress completely the transient direct current impulse compared with the signalling alternating current at the receiver station. In order to attain this object the receiver station must be so arranged, that the oscillations of high frequency are received with their full amplitude, but oscillations of low frequency are effectively weakened. This may be attained for instance, by connecting a choking coil to the cable at the receiving station, in the manner illustrated in Fig. 3. The arriving currents cause a voltage drop between the points $a$ and $b$, which becomes operative at the receiver. This voltage drop may be analyzed into the portion produced by the alternating carrier current and the tension corresponding with the transient component.

With respect to the alternating current $I_e$ the coil has an impedance of the approximate value $\omega L$, wherein $\omega$ is the angular velocity and $L$ the inductivity of the coil. The transient current component $I_s$ finds on the other hand mainly only the direct current resistance $R$ of the coil. The voltage acting upon the receiver is therefore composed of the values $I_e \omega L$ and $I_s R$.

From this it is obvious, that by an appropriate choice of inductance and resistance, viz, a large value for $L$ and small value for $R$, it is possible to reduce the direct current impulses as much as desired, so that the highest value which they may attain represents only an insignificant amount compared with the amplitude of the carrier current.

The following example will make this clear.

The length of a submarine cable is assumed to be 4000 km, and it is further assumed that the inductance of the cable has been increased by any appropriate means, for instance by a Krarup covering to the value 0,02 henry per km. The resistance of the copper conductor is assumed to amount to 1,2 ohm per km, the capacity to 0,2 microfarad, the leakage angle $\delta$ for the balata insulation $\delta=0,004$. Then the well known formula for the damping is $$\beta = \frac{R}{2}\sqrt{\frac{C}{L}} + \frac{\delta \omega C}{2}\sqrt{\frac{L}{C}}$$

At the angular velocity $\omega=1000$ $$\beta = 0,01898 + 0,00127 = 0,02025$$

thus the total reactance $$\beta l = 8,10$$

If the choking coil has the inductance 0,2 H., then the apparent resistance is equal to 200 Ω. The voltage drop at this coil has therefore at a transmitting potential of 100 volts, according to the theory a value of $$V = \frac{2 E e^{-\beta l} \cdot j^{200}}{\sqrt{\frac{L}{C}} + j^{200}} = 0.0328 \text{ volts.}$$

The direct current impulse amounts for the cable in question to the value of $$6,08 \cdot 10^{-5} \text{ amp.}$$

This result can be obtained by using the formula:

$$AU(t) = \frac{A}{\omega} \cdot \frac{d\Phi}{dt}$$

in which $A=100$.

If therefore the coil has a direct current resistance of $R=10$, the direct current component at the receiver is reduced to the amount $$6,08 \cdot 10^{-5} \cdot 10 = 0,000608 V$$

and thus is small compared with the carrier current.

If on the other hand the coil did not exist, the alternating current tension and the direct current tension would be in the same order magnitude.

Figure 4:
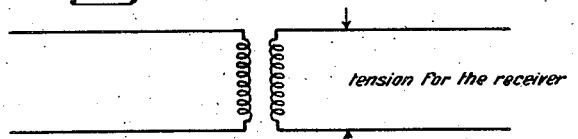
Fig. 4 is a modification of the receiving arrangement shown on Fig. 3.

A condition for the favorable action of the coil is that the impedance of the receiving apparatus, for instance the amplifier, is a multiple of the impedance of the coil. Instead of the coil a transformer may thus be employed, from the secondary circuit of which the potential for the receiver is derived. The primary coil of the transformer then takes the place of the before described choking coil. This arrangement has the advantage, that simultaneously with the suppression of the disturbing impulse a transformation of the working voltage is attained. This is shown in Fig. 4.

Instead of the choking coil a condenser in series with the receiving apparatus may be employed for the same purpose. Both means may also be employed in combination and a plurality of them may be provided. The result aimed at would also be attained by the employment of a filter chain which would keep off the disturbances arising from frequencies higher than the carrier frequency; besides the disturbing direct current impulses.

What we claim as our invention and desire to secure by Letters Patent is:—

1. Method of telegraphy over long cables consisting in transmitting the signals by means of a carrier alternating current whose frequency depends upon the cable constants according to the formula $$\omega_0 = \frac{2}{\delta\sqrt{LCl}},$$

wherein $\delta$ denotes the dielectric power factor, $L$ the inductance, $C$ the capacity and $l$ the length of the cable.

2. Method of telegraphy over long cables consisting in transmitting the signals by means of a carrier alternating current whose frequency is located in the neighborhood of a range (0.4 to $2\omega_0$) within which no appreciable variation exists in the ratio of the alternating current amplitude to the transient direct current, whereby $\omega_0$ is given by the cable constants according to the formula $$\omega_0 = \frac{2}{\delta\sqrt{LCl}},$$

wherein $\delta$ denotes the dielectric power factor, $L$ the inductance, $C$ the capacity and $l$ the length of the cable.

3. Method of multiple telegraphy over long cables consisting in transmitting several signals simultaneously over the same cable through a plurality of carrier alternating currents of different frequencies, all of which frequencies are located in the neighborhood of a range (0.4 to $2\omega_0$) within which for each frequency no appreciable variation exists in the ratio of the alternating current amplitude to its pertaining transient direct current, whereby $\omega_0$ is given by the cable constants according to the formula $$\omega_0 = \frac{2}{\delta\sqrt{LCl}},$$

wherein $\delta$ denotes the dielectric power factor, $L$ the inductance, $C$ the capacity and $l$ the length of the cable.

In testimony whereof we affix our signatures.

FRITZ LÜSCHEN.
KARL KÜPFMÜLLER.